US008719935B2

(12) United States Patent
Polyakov et al.

(10) Patent No.: US 8,719,935 B2
(45) Date of Patent: May 6, 2014

(54) MITIGATING FALSE POSITIVES IN MALWARE DETECTION

(75) Inventors: Alexey A. Polyakov, Sammamish, WA (US); Ravi Bikkula, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 12/684,719

(22) Filed: Jan. 8, 2010

(65) Prior Publication Data

US 2011/0173698 A1 Jul. 14, 2011

(51) Int. Cl.
G06F 21/00 (2013.01)
G06F 21/56 (2013.01)

(52) U.S. Cl.
CPC .................................. *G06F 21/564* (2013.01)
USPC .......................................................... 726/23

(58) Field of Classification Search
CPC .................................................... G06F 21/564
USPC ..................................................... 726/23–25
See application file for complete search history.

(56) References Cited

U.S. PATENT DOCUMENTS

| 8,312,537 | B1* | 11/2012 | Nachenberg et al. ........... 726/22 |
| 2005/0132206 | A1* | 6/2005 | Palliyil et al. .................. 713/188 |
| 2006/0041942 | A1 | 2/2006 | Edwards |
| 2008/0086773 | A1 | 4/2008 | Tuvell |
| 2008/0256636 | A1 | 10/2008 | Gassoway |
| 2009/0013405 | A1 | 1/2009 | Schipka |
| 2009/0172815 | A1 | 7/2009 | Gu |

OTHER PUBLICATIONS

ConSentry Networks' Robust Threat Control (2006) http://www.consentry.com/download/conSentryThreat_4-14.pdf, retrieved Nov. 3, 2009.
Endpoint Security: Proactive Solutions for Networkwide Platforms (Feb. 2009) http://www.eset.com/download/whitepapers/EndpointSecurity.pdf, retrieved Nov. 3, 2009.
Simpler-Webb Uses Cisco Security Solutions to Give Enterprise-Class Protection (1992-2009) http://www.cisco.com/en/US/prod/collateraol/vpndeve/ps5729/ps5713/ps4077/prod_case_study0900aecd8031b8a9.html, retrieved Nov. 3, 2009.
Automatically Generating Models for Botnet Detection, ESORICS 2009, Sep. 2009, http://honeyblog.org/junkyard/paper/esorics_25_botnet.pdf, retrieved Nov. 4, 2009.

* cited by examiner

*Primary Examiner* — Hadi Armouche
*Assistant Examiner* — Dao Ho
(74) *Attorney, Agent, or Firm* — Henry Gabryjelski; Kate Drakos; Micky Minhas

(57) ABSTRACT

An anti-malware system that reduces the likelihood of detecting a false positive. The system is applied in an enterprise network in which a server receives reports of suspected malware from multiple hosts. Files on hosts suspected of containing malware are compared to control versions of those files. A match between a suspected file and a control version is used as an indication that the malware report is a false positive. Such an indication may be used in conjunction with other information, such as whether other hosts similarly report suspect files that match control versions or whether the malware report is generated by a recently changed component of the anti-malware system.

20 Claims, 9 Drawing Sheets

File Information Repository 230

| File Name | Version | Hash | File Content |
|---|---|---|---|
| File1 | 2.0 | ff1e0283123d14cf8bd52ac449770017 | ... |
| File2 | 1.1 | b445bf8b5da4cf880dd14e98c18c1bfa | ... |
| File3 | 1.0 | 426d539b91225abc6f8858494bf658a2 | ... |
| File3 | 2.0 | d068a4b700f660879de6c57a64c762db | ... |
| File4 | 1.0 | 0330356a133d698961cd9889c337f6df | ... |

FIG. 2B

Host Directory 240

| Host Name | File Name | Version |
|---|---|---|
| HostA | File1 | 2.0 |
| | File2 | 1.1 |
| | File3 | 1.0 |
| | ... | |
| HostB | File2 | 1.1 |
| | File3 | 2.0 |
| | File4 | 1.0 |
| | ... | |

FIG. 2C

MITIGATING FALSE POSITIVES IN MALWARE DETECTION

BACKGROUND

Computer systems, especially those connected to a network, are often subject to malicious attacks. For instance, an attacker may introduce unwanted software, generally referred to as "malware," into a target system and attempt to cause the target system to execute the malware. Such malware is typically designed to carry out some unauthorized and/or undesirable activity, for example, stealing sensitive data from the target system, controlling the target system to participate in a distributed attack on another system, or even disabling the target system. These attacks can lead to extended service interruptions and/or compromise of critical data, which in turn can result in economic losses for businesses, damage to information technology infrastructure and inconvenience to users.

Malware comes in a variety of forms, including viruses, worms, Trojan horses, adware, spyware and the like. To defend against such malware, a variety of tools have been devised and deployed to detect malware and to prevent it from being executed on a computer. For example, firewalls and proxies may be configured to screen network traffic for malware, and security settings may be added to vulnerable applications to prevent malware from being executed. An anti-malware program may also be installed on a computer to scan the computer's hard disk for any files that may contain malware. During such a scan, the anti-malware program may look for specific patterns, or "signatures," that are known to be associated with certain types of malware. If one or more signatures are found in a file, the anti-malware program may declare the file to be potentially malicious and may, in some instances, proceed to clean the file by removing suspicious portions or even to remove the entire file.

To maintain effectiveness against newly released malware, the list of signatures used by an anti-malware program may be updated periodically, for example, by communicating with an anti-malware service provider or vendor that analyzes recent malware attacks and publishes corresponding signatures. Additionally, the anti-malware program may use one or more malware detection heuristics in combination with the signature-based analysis. These heuristics may be effective in protecting the computer from a "zero-day attack" (e.g., a malware attack for which a signature is not yet available) or a polymorphic attack that mutates itself to elude signature detection (e.g., by making cosmetic, non-functional changes to the malicious code).

For reasons such as poor signature generation, imperfect heuristics or simply a bug in the anti-malware program, a file may sometimes incorrectly be identified as being potentially malicious. This type of error is generally referred to a false positive error, or a false positive. On the other hand, an anti-malware program may fail to identify a file that does containing malware. This latter type of error is generally referred to a false negative error, or a false negative.

SUMMARY

The burden of administering a computer system is reduced by reducing false positives generated by anti-malware components of the system. When an anti-malware agent executing on a host in the system generates a report of malware on the host, the report may be processed to exclude false positives. In some embodiments, false positives are identified by comparing files identified by the anti-malware agent as suspected of containing malware with control versions of the same file. When the suspected file matches the control version, the malware report may be treated as a likely false positive and processed accordingly. If a false positive is detected, one or more corrective actions may be taken, including reporting the false positive and/or restoring files modified or disabled by the anti-malware components of the system.

In some embodiments, comparison of a suspected file to a control is used in combination with other information in making a determination of whether a report from an anti-malware agent indicates a malware infection or a false positive. Other sources of information may include whether other hosts reported a similar malware infection or whether the report of malware was generated by a component in the anti-malware system that changed within an interval preceding the report.

In an enterprise network, processing to identify false positives and/or to take corrective actions in response to detection of a false positive may be performed on a server to which multiple hosts within the enterprise send malware reports. That server may store or have access to a repository of information about files without malware infections to act as control files. The comparison may be based on information summarizing the content of a suspect file, such as a hash of the file. The repository may similarly contain summary information about files.

The foregoing is a non-limiting summary of the invention, which is defined by the attached claims. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The accompanying drawings are not intended to be drawn to scale, emphasis instead generally being placed upon illustrating the inventive concepts.

FIG. 2B shows an example of a file information repository for maintaining various versions of files, in accordance with some embodiments of the present disclosure.

FIG. 2C shows an example of a host directory that maps host identifiers to corresponding file versions, in accordance with some embodiments of the present disclosure.

DETAILED DESCRIPTION

Figure 1A:
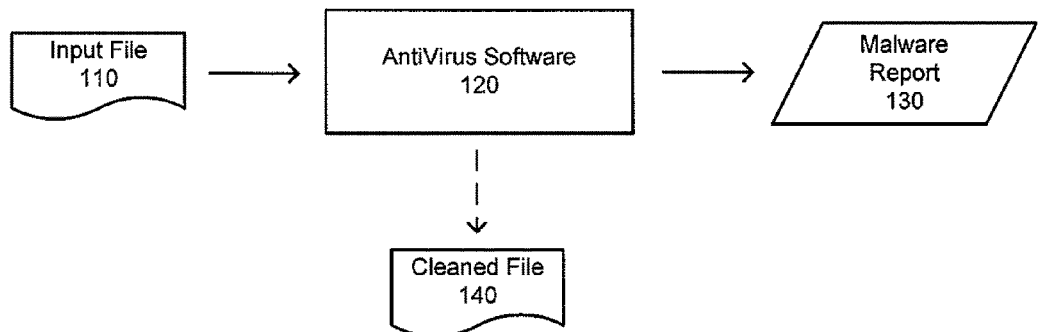
FIG. 1A shows an example of an anti-malware program adapted to scan an input file to detect any potential malware, in accordance with some embodiments of the present disclosure.

The inventors have recognized and appreciated that the burden of administering a computer system, particularly, an enterprise system, can be reduced by reducing false positives generated by anti-malware components of the system.

In a false negative scenario, damage to a computer system may be caused by the execution of malware that escapes the detection of an anti-malware program. By contrast, in a false positive scenario, damage may be caused by corrective actions taken by an anti-malware program or some other program responding to the potential threats identified by the anti-malware program. For instance, a file mistakenly identified as potentially malicious may be "cleaned" or "disinfected" by removing suspicious portions of the data contained in the file. Alternatively, the file may be "quarantined" (e.g., moved to a safe location where it will not be executed), or deleted altogether. These corrective measures may damage a harmless file or otherwise make it unavailable to the computer system.

The inventors have appreciated that false positive errors in malware detection may be just as destructive as false negative errors. For example, if a critical system file is incorrectly cleaned or removed, the operating system (OS) may become unusable and may need to be partially or completely re-installed. Similarly, if the file is associated with a mission-critical software component, its damage or removal may lead to severe service interruptions.

Accordingly, in some disclosed embodiments, systems, methods and apparatus are provided for recognizing false positives in malware detection. For example, upon receiving a malware report from an anti-malware program, an analysis may be carried out determine whether the malware report is a likely false positive. The analysis may include comparing a suspicious version of a file implicated in the malware report with a control version of the same file that is believed to be free of malware. A match between the suspicious version and the control version may indicate that no changes have been made in the file and therefore the malware report is likely a false positive. On the other hand, a mismatch may indicate that the file has been modified in some way and may indeed contain malware.

In some embodiments, a comparison between two versions of a file may be carried out by comparing summary values representing the two versions respectively. A summary value may be a hash value generated based on at least a portion of a file. For example, a hash value may be generated using a portion of the suspicious version of the file and compared with a hash value generated using a corresponding portion of the control version. Alternatively, hash values may be generated and compared using the two versions in their entireties.

A control version of a file may be made available in different ways. In some embodiments, the control version may be stored in a file information repository and indexed in a suitable manner, for example, based on file name and version identifier. In some further embodiments, the file information repository may map a host identifier to versions of files used and/or stored by the corresponding host. For example, a control version of a file associated with a particular host may be accessed from the file information repository by providing an identifier for the host and a file name and/or path.

While hash values may be generated as needed, for example, when a malware report is received and a false positive analysis is initiated, they may alternatively be computed and stored in advance. For example, one or more hash values generated from a file (or portions thereof) may be stored in the file information repository in addition to, or instead of, the file itself.

Information relating to the suspicious version of a file may also be obtained in different ways. For example, upon receiving a malware report from a host identifying a particular file as potentially malicious, an attempt may be made to access the file from a hard disk of the host. However, such an attempt may fail in some situations, for example, where active malware on the host is blocking access to the file or where the file is a system file and the OS is preventing read access. To resolve such an access issue, the host computer may be booted in an offline scanning environment in which the main OS and any potential malware become inactive, so that the suspicious file may be accessed and analyzed to determine the likelihood of a false positive.

In some further embodiments, the suspicious file may not be directly recoverable because the anti-malware program issuing the malware report may have attempted to clean or remove it. In that case, a hash of the suspicious file prior to the attempted cleaning or removal may still be available in the malware report and may be used in the false positive analysis.

In yet some further embodiments, one or more appropriate corrective actions may be implemented when a malware report is determined to be a likely false positive. A corrective action may include disabling one or more portions of an anti-malware program. For instance, if it is determined that the false positive is due to imperfect heuristics in the anti-malware program, a host may disable such heuristics to prevent further false positives. Similarly, if it is determined that the false positive is due to a poorly generated malware signature, the host may add the problematic signature to an "ignore" list or may revert to a previous set of signatures not containing the problematic signature. If, on the other hand, it is determined that the false positive is due to one or more bugs in the anti-malware program, the host may disable the program or revert to an earlier version of the program. Additionally, in any of these situations, the false positive may be reported to a vendor providing the anti-malware program so that a more permanent solution may be found.

The inventors have further appreciated that the negative effects of false positive errors may be magnified in an enterprise environment, in which multiple hosts may run similar OS components and/or software applications. For instance, where multiple host computers are reporting detected malware, it may be difficult for a system administrator to decide whether to initiate a network shutdown. On the one hand, if the incoming reports correspond to a true malware outbreak, a delay in shutting down the network may cause more host computers to become affected and therefore lead to more wide-spread damages. On the other hand, if the reports are merely false positives, a network shutdown may be an unnecessary interruption to enterprise operations, which may be costly in terms of lost productivity.

Accordingly, false positive detection and mitigation techniques may be adapted to take into account multiple hosts. In some embodiments, a false positive analysis may be triggered when a trend is observed across a network, for example, when malware reports involving the same type of malware attacks and/or affected files are received from multiple hosts. As another example, if a malware report from a particular host is determined to be a likely false positive, other hosts may be notified of the problem and may implement one or more corrective actions accordingly.

In yet some further embodiments, one or more actions may be taken to reverse at least some of the effects of false positives. For instance, a file damaged by malware and/or incorrect cleaning by an anti-malware program may be restored using a corresponding control version retrieved from a file information repository. This feature may be particularly advantageous in an enterprise environment, where system and/or application files are likely to be shared across multiple host computers. For example, system and/or application files on the hosts need not be individually backed up. Rather, a host directory may be created that maps each host in the network to corresponding versions of system files and/or application files. In this manner, an affected host may be repaired by first identifying the versions of the damaged files using the host directory and then retrieving the identified versions from the file information repository.

Following below are more detailed descriptions of various concepts related to, and embodiments of, inventive systems, methods and apparatus for recognizing false positives in malware detection and for mitigating the impact of false positives in an enterprise environment. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided primarily for illustrative purposes.

FIG. 1A shows an example of an anti-malware program 120 adapted to scan an input file 110 to detect any potential malware. The input file 100 may come from any suitable source, as the present disclosure is not limited in this regard. For example, the input file 110 may be a file encountered by the anti-malware program 120 during a scan of a hard drive, and may be a system file, an application file or a user data file. Alternatively, the input file 110 may be received from an external source, for example, via an email attachment or a download using a Uniform Resource Locator (URL).

As discussed above, the anti-malware program 120 may use a number of different techniques as known in the art to analyze the input file 110, including scanning for known malware signatures, applying signature-independent detection heuristics and/or running the input file 110 in a sandbox. One or more outcomes of the analysis may be summarized in a malware report 130 output by the anti-malware program 120, which may indicate whether the input file 110 is likely to contain malware. In some embodiments, the anti-malware program 120 may attempt to clean the input file 110 by removing one or more suspicious portions, resulting in the cleaned file 140.

Figure 1B:
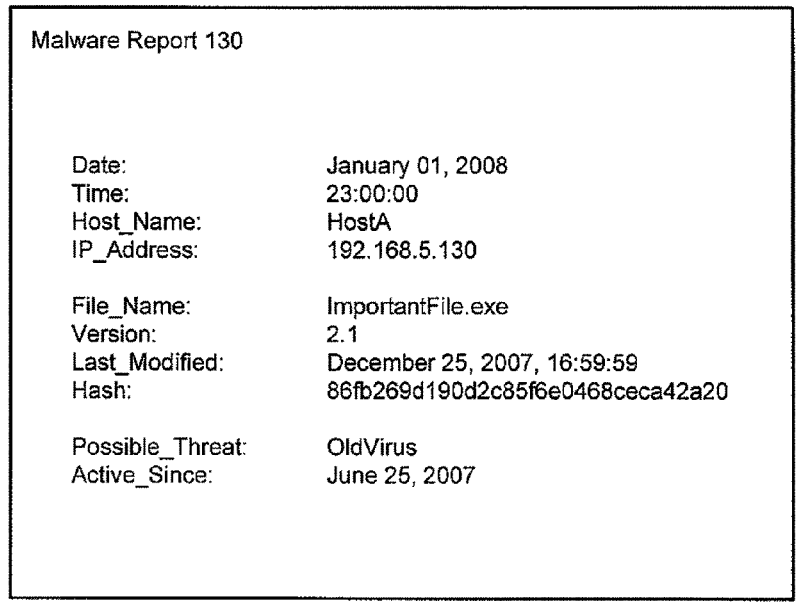
FIG. 1B shows an example of a malware report that may be generated by an anti-malware program, in accordance with some embodiments of the present disclosure.

FIG. 1B shows an example of a malware report 130 that may be generated by the anti-malware program 120. In the illustrated embodiment, the malware report 130 identifies the suspicious file using a file name (e.g., "ImportantFile.exe"). Additionally, the malware report 130 may contain other information regarding the suspicious file, such as a version number (e.g., "2.1"), a time at which the file was last modified (e.g., "Dec. 25, 2007, 16:59:59") and/or a hash of the file at the time the malware report was generated (e.g., "86fb269d190d2c85f6e0468ceca42a20"). For instance, the hash may be generated based on the content of the file before the anti-malware program made any attempt to clean the file.

The malware report 130 may identify one or more malware attacks that may be present in the suspicious file. For example, as shown in FIG. 1B, the malware report 130 lists a virus named "OldVirus" as a possible threat posed by the suspicious file. The listed virus may be associated with an "Active_Since" date (e.g., "Jun. 25, 2007"), indicating when the virus was discovered and/or when a signature for the virus was published.

The malware report 130 may contain further information relating to the suspicious file and/or the suspected malware attacks. For example, the malware report 130 may include date information (e.g., "Jan. 1, 2008") and time information (e.g., "23:00:00") indicating the time at which the suspected malware was detected. As another example, the malware report 130 may further identify the host computer on which the suspected malware was detected, for example, by including a host name (e.g., "HostA") and/or an IP address (e.g., "192.168.5.130").

While FIG. 1B illustrates specific examples of information items relating to an instance of malware detection, it should be appreciated that these examples are provided for purposes of illustration only. Other combinations of suitable information items may be included in a malware report, as the present disclosure is not limited in this respect. For example, although not show, the malware report 130 may include a file system path specifying a location of the suspicious file and/or information regarding a software component associated with the suspicious file. As another example, some of the information contained in the malware report 130, such as the "Active_Since" date for the identified malware, may be eliminated either because it is not used in the false positive analysis or because the server 220 has access to the information from other sources.

Figure 2A:
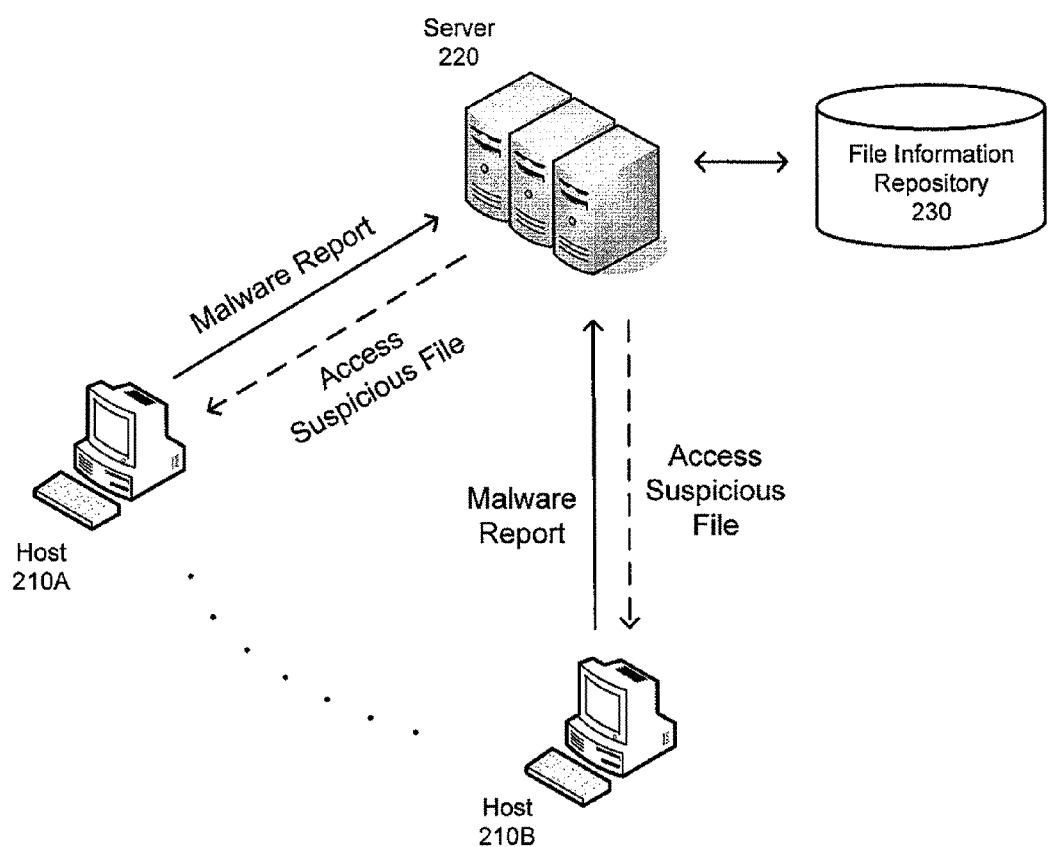
FIG. 2A shows an illustrative enterprise computing environment, in accordance with some embodiments of the present disclosure.

FIG. 2A shows an illustrative enterprise computing environment in accordance with some embodiments of the present disclosure. For example, the enterprise environment may include at least one server computer 220 in communication with one or more host computers 210A, 210B, .... When an anti-malware program running on a host (e.g., host 210A) detects one or more potential malware attacks, it may generate a malware report, which may be in the form of report 130 shown in FIG. 1B or any other suitable form, and may send the report to the server 220. Upon receiving such a report, the server 220 may analyze information contained therein to determine whether the report is likely a false positive. For example, as discussed above, the server 220 may compare a suspicious version of a file identified in the received malware report against a control version of the file. A match between the two versions may indicate that no changes have been made in the file and therefore the malware report is likely a false positive. On the other hand, a mismatch may indicate that the file has been modified and may indeed contain malware.

The comparison between the suspicious version and the control version of a file may be carried out in a number of different ways, as the present disclosure is not limited in this respect. In some embodiments, the server 220 may extract relevant information from the malware report and use the extracted information to retrieve the appropriate control version of the file from a file information repository 230. For example, as shown in FIG. 2B, the file information repository 230 may be organized to allow indexing by file name, hash value and/or some other suitable attribute.

The file information repository 230 may comprise data stored in one or more suitable computer-readable media. The stored data may include files archived by a system administrator when the system is not believed to be affected by malware, and/or files obtained from a trusted source such as a software vendor.

In some embodiments, one or more of the maintained files may have known content. For instance, they may be executable files for the OS or some software application. In such an embodiment, the file information repository 230 may also store information that associates the maintained files with corresponding OS components and/or software applications. Accordingly, the file information repository 230 may also be indexed using a combination of file name, OS component name and/or software application name.

In some situations, where multiple versions of the same file is maintained by the file information repository 230 (e.g., versions "1.0" and "2.0" of "File3"), the appropriate control version may be retrieved by further providing a version identifier (e.g., version "2.0"). This version identifier may be available directly from a malware report. Alternatively, the server 220 may look up the appropriate version identifier from a host directory using other information available from the malware report.

FIG. 2C shows an example of a host directory 240 that may be accessed by the server 220 to look up an appropriate version identifier for a file. In this embodiment, the host directory 240 keeps track of file versions associated with one or more hosts on the network, for instance, by mapping host identifiers (e.g., host names and/or IP addresses) to lists containing file names and corresponding version identifiers. As a more specific example, the host directory 240 may map the host name "HostA" to a list containing at least three files, "File 1," "File2," "File3," . . . with respective version identifiers "2.0," "1.1," "1.0," . . . . In other words, according to the host directory 240, the version of "File1" stored on "HostA" is "2.0," the version of "File2" stored on "HostA" is "1.1," the version of "File3" stored on "HostA" is "1.0," and so on.

In addition to retrieving the control version of a file implicated in a malware report, the server 220 may attempt to access the suspicious version of the file from the reporting host (e.g., host 210A) and compare at least a portion of the suspicious version against a corresponding portion of the control version retrieved from the file information repository 230. Alternatively, a pertinent portion of the suspicious version may be included in the malware report received by the server 220 and may be extracted therefrom for comparison with the control version.

Instead of comparing actual file content, the server 220 may, in some further embodiments, compare hash values generated from the suspicious version and the control version of the file (or corresponding portions thereof). These hash values may be calculated as needed, for example, by the server 220 upon initiating a false positive analysis. Alternatively, they may be generated in advance and stored in some appropriate manner. For example, as shown in FIG. 2B, the file information repository 230 may store one or more hash values for at least some of the maintained files. In this manner, the server 220 may retrieve either the actual file content, or a hash value, or both.

While the examples illustrated in FIGS. 2A-C relate to an enterprise environment having multiple host computers operating on one or more networks, it should be appreciated that the present disclosure is not so limited. The methods disclosed herein for recognizing and mitigating false positive in malware detection may also be implemented on a single host or other combinations of components. For example, a malware report may be processed by a host to determine a likelihood of false positive, while information relating to control versions of files may be obtained elsewhere.

Figure 3:
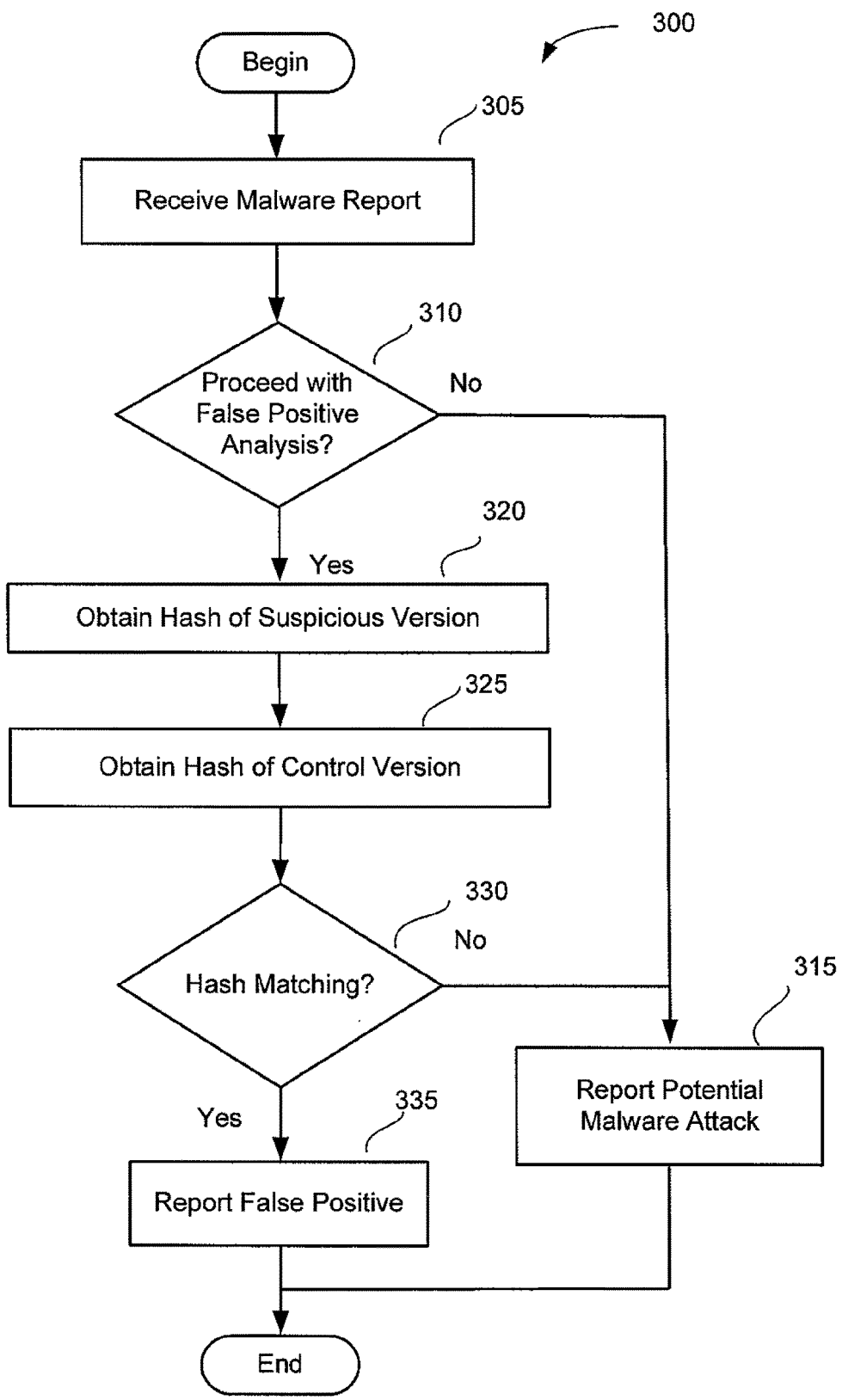
FIG. 3 shows an illustrative process for recognizing potential false positives in malware detection, in accordance with some embodiments of the present disclosure.

FIG. 3 shows an illustrative process 300 for recognizing potential false positives in malware detection. For example, the process 300 may be a high-level process performed by the server 220 of FIG. 2A in response to receiving a malware report from a host computer. Alternatively, the process 300 may be performed by a host computer in response to a malware report received from an anti-malware program running on the host computer itself.

In the illustrated embodiment, the process 300 is initiated at act 305, where a malware report is received that identifies a suspicious file on a host computer. At act 310, one or more initial checks may be triggered to determine whether the received malware report is a possible false positive that warrants further analysis. As explained in greater detail in connection with FIG. 4, the initial checks may include analyzing malware reports from multiple hosts and/or determining whether the received malware report involves newly updated software or malware signature. More generally, the initial checks at act 310 may be performed to identify "easy" cases in which the likelihood of a false positive is low, or in which false positives can be identified without analysis. In such cases, it may be more economical to bypass the false positive analysis.

If it is determined at act 310 that a false positive analysis is not desirable because the likelihood of false positive is low, the process 300 proceeds to act 315 to report a potential malware attack. Various corrective actions may then be taken to isolate the potential attack and repair any damage. For example, a system administrator may take the affected computer offline and may activate network restriction software and/or hardware to prevent further spreading of the malware. Additionally, affected files may be replaced either manually or automatically, for example, using the corresponding control versions of the files from a file information repository (e.g., the file information repository 230 shown in FIG. 2A). Other corrective actions may also be suitable, as the present disclosure is not limited in this respect.

Figure 5:
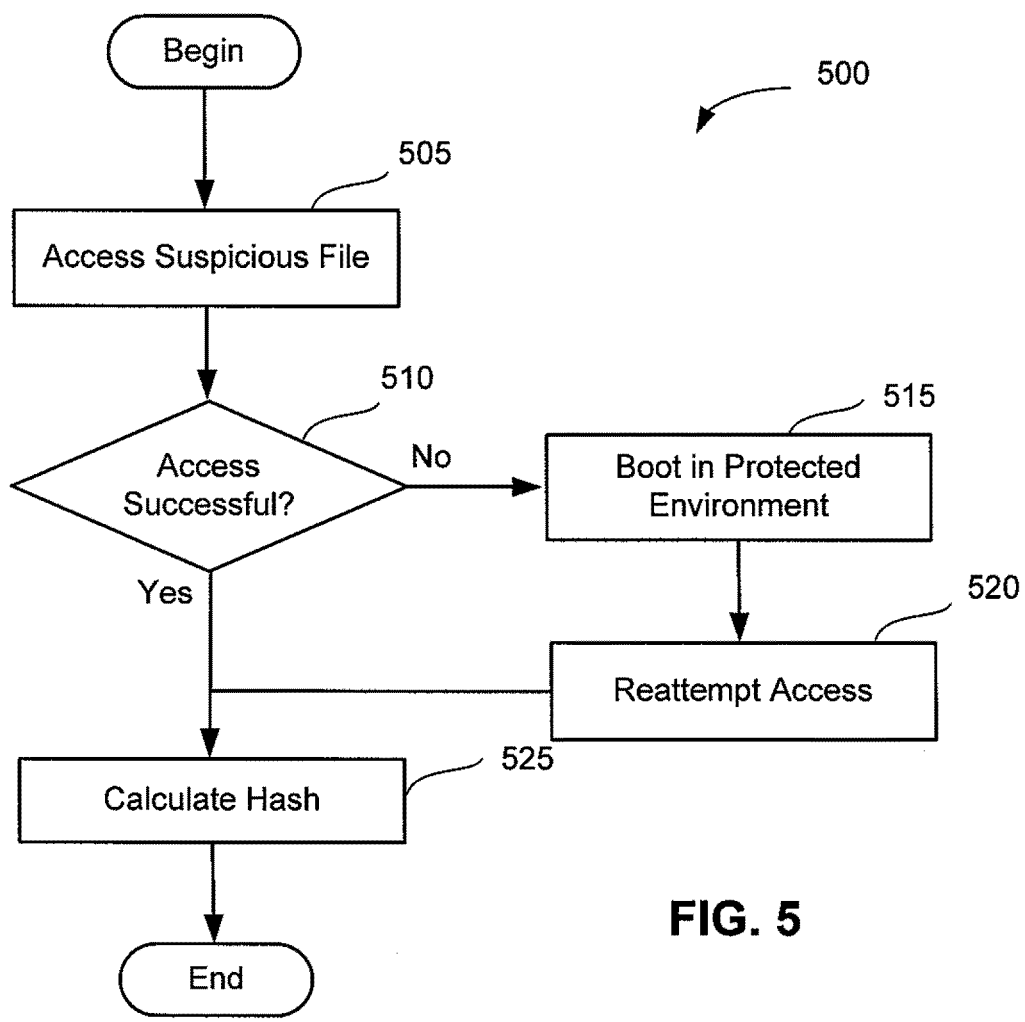
FIG. 5 shows an illustrative process for accessing a suspicious file from a host computer, in accordance with some embodiments of the present disclosure.

If it is determined at act 310 that a false positive analysis is desirable, the process 300 proceeds to obtain summary information associated with the suspicious version of the file implicated in the received malware report. As discussed above, such summary information may be used to identify the suspicious version of the implicated file and allow a comparison between the suspicious version and a control version of the implicated file. For example, at act 320, one or more hash values associated with the suspicious version of the implicated file may be obtained. In some embodiments, such hash values may be included in the received malware report and may simply be extracted therefrom. Alternatively, the hash values may be obtained, for example, by first accessing the suspicious version of the file from the host identified in the received malware report and then calculating a hash value accordingly. An illustrative method for accessing a suspicious file from a host is shown in FIG. 5 and explained below.

Proceeding to act 325, summary information (e.g., one or more hash values) associated with a control version of the implicated file may be obtained in a suitable manner. For instance, in some embodiments, the received malware report may indicate a file name and version identifier for the implicated file. This information may be used to retrieve the control version from a file information repository (e.g., the file information repository 230 shown in FIG. 2A) and the hash values may be calculated accordingly. In some further embodiments, the received malware report may include a host identifier, which may be used to look up a version identifier for the implicated file in a host directory (e.g., the host directory shown in FIG. 2C). The version identifier may then be used to retrieve the control version of the file from a file information repository. In yet some further embodiments, the file information repository may store hash values in addition to actual file content, so that a desired hash value may be retrieved directly.

Figure 7:
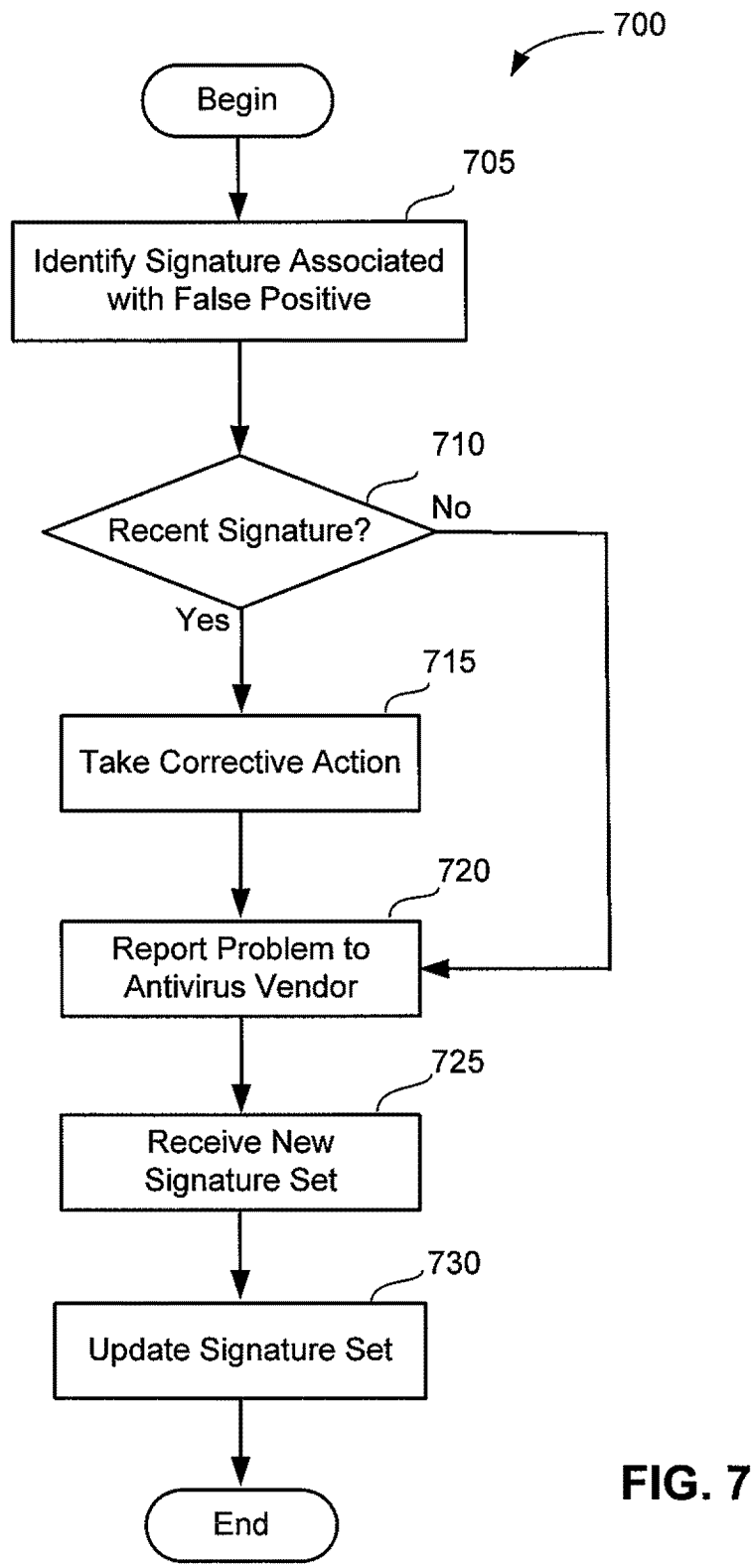
FIG. 7 shows an illustrative process for mitigating potential negative effects of false positives in malware detection, in accordance with some embodiments of the present disclosure.

Having obtained summary information, which in the illustrated embodiment is hash values for both the suspicious version and the control version of the implicated file, a comparison may be made to determine whether the suspicious version matches the control version or has been changed, likely by malware. For instance, at act 330, the hash values may be compared to determine whether the suspicious version matches the control version. If a match is not found, the process may proceed to act 315 to report a malware outbreak. Otherwise, if a match is found, the process may proceed to act 335 to report a likely false positive malware detection, after which one or more suitable mitigating actions may be carried out to reduce the negative effects of the false positive detection. An illustrative method for mitigating the effects of false positive malware detection is shown in FIG. 7 and is explained in greater detail below.

Figure 4:
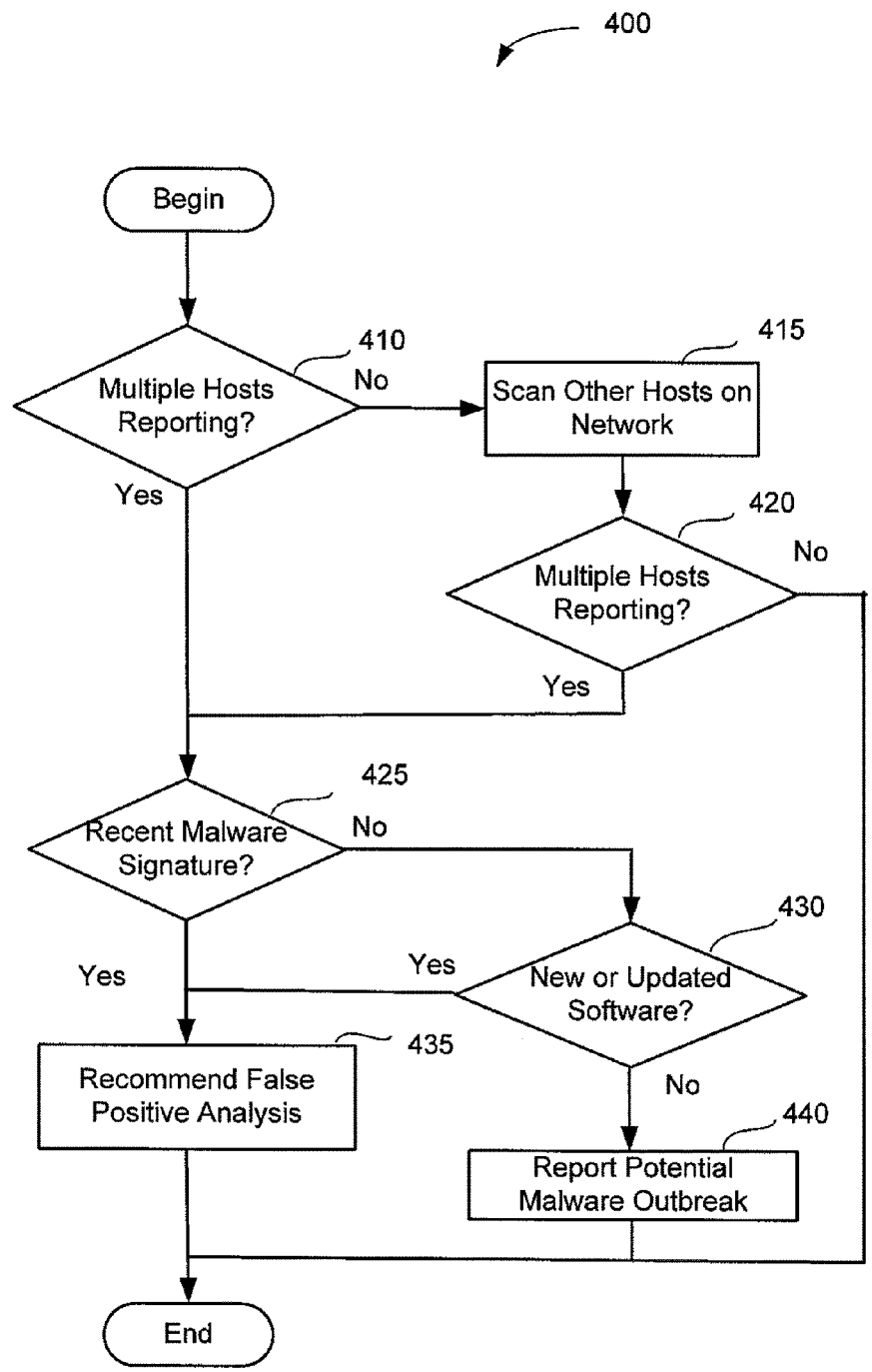
FIG. 4 shows an illustrative process for determining whether a received malware report is a possible false positive, in accordance with some embodiments of the present disclosure.

Turning to FIG. 4, an illustrative process 400 is shown for determining whether a received malware report is a possible false positive that warrants further analysis. For example, the process 400 may be performed during act 310 of the process 300 shown in FIG. 3. Additionally, the process 400 may be performed by, or under the control of, the server 220 shown in FIG. 2, or by another suitable computing device.

The process 400 may be initiated when a malware report is received that identifies a suspicious file on a host computer. At act 410, it is determined whether similar reports have been received from multiple host computers, as part of an attempt to identify any emerging trends of malware detection across multiple hosts. Various techniques may be employed in identifying such trends, as the present disclosure is not limited in this respect. For example, it may be determined whether multiple reports have been received that identifies the same attack (or similar attacks in the same family of malware). As another example, it may be determined whether the same file or type of files is implicated in the received malware reports. As yet another example, it may be determined whether the implicated files are associated with the same operating system component and/or software component.

If no similar reports are identified at act 410, the process 400 may proceed to act 415 to initiate a malware scan on other hosts, for example, those residing on the same network as the reporting host. Such scanning may advantageously identify other hosts that may also be affected by the potential malware but have for some reason not yet reported (e.g., due to different malware scanning routines). Or, in case of false positive, the scanning may identify hosts that would have experience false positive reports in the future.

The scope of the scanning may vary depending on a number of different factors. For example, if the suspected malware is known to target a basic operating system component likely to be present on many hosts, a scan may be initiated on all hosts across an entire enterprise, possibly including multiple local area networks. On the other hand, if the suspected malware is known to target some specific software, a scan may be initiated only on those hosts running the software.

When one or more other hosts have finished their scanning, it is again determined, at act 420, whether multiple malware reports of a similar nature have been received. If the result is still negative, it may be determined that the original malware report is not likely to be a false positive, in which case appropriate corrective actions may be taken locally and the process 400 may end.

If, on the other hand, one or more trends of malware detection are observed at either act 410 or act 420, the process 400 may proceed to act 425 to determine whether the received malware report involves a recently updated signature, for example, within the past 24, 48 or 72 hours. As discussed above, the list of malware signatures used by an anti-malware program may be updated periodically and/or as needed to protect against newly discovered malware attacks, so that a recently updated signature may trigger a malware report on a file even if the file has not been changed since a previous malware scan. Thus, if it is determined at act 425 that the received malware report does involve a recently updated signature, the process 400 may proceed to act 435 to report a likely false positive and recommend further analysis.

If at act 425 it is determined that the received malware report does not involve a recently updated signature, the process 400 proceeds to act 430 to determine whether one or more files implicated in the malware report are associated with newly installed and/or updated software. For example, one or more implicated files may be part of a recently downloaded and installed software patch. In such a situation, the malware report is also likely to be a false positive, and the process 400 may proceed to act 435 to report accordingly. If, on the other hand, the implicated files are not associated with newly installed and/or updated software, the process 400 may proceed to act 440 to report a potential malware outbreak. Reporting may be done in any suitable way, for instance, by sending an alert message (e.g., via email, pop-up window, etc.) to an administrator and/or recording an entry in an event log.

It should be appreciated that the various implementations of the process 400 described above are provided merely for purposes of illustration, as other alternative implementations may also be suitable. For instance, at either or both of the acts 410 and 420, a threshold analysis may be used to determine whether sufficiently many hosts are reporting similar types of malware detection. As a more specific example, at acts 410 and/or 420, it may be determined whether the amount of reporting hosts exceeds a certain percentage (e.g., 20%, 15%, 10%, 5%, etc. of hosts within an enterprise) or a certain number (e.g., 50, 25, 10, 5, etc.). Moreover, different threshold values may be selected for different checkpoints in the process 400 (e.g., acts 410 and 420).

FIG. 5 shows an illustrative process 500 for accessing a suspicious file from a host computer. The process 500 may be performed, for example, when it is determined that a received malware report is a possible false positive and that further analysis of the suspicious file identified in the malware report is either necessary or desirable.

The process 500 may begin at act 505 by attempting to access the suspicious file from the host computer identified in the malware report. In some embodiments, the attempted access may be performed by a server (e.g., the server 220 shown in FIG. 2A) that resides on the same local area network as the host computer. Alternatively, the server may reside on a different network and may be configured to access the suspicious file from the host computer via some suitable networking technology, such as a virtual private network (VPN).

In some further embodiments, the act 505 may be performed by a client module running on the host computer that attempts to access the suspicious file in response to a request from a server performing a false positive analysis. In yet some further embodiments, the false positive analysis may be performed by a software component running on the host computer (as opposed to a server) and the act 505 may simply involve a local file access.

At act 510, it is determined whether the attempted access of act 505 is successful. If so, the process 500 may proceed to act 525 to compute one or more hash values based on one or more portions of the accessed file for use in the false positive analysis. However, the attempted access of act 505 may fail in some situations, for example, where active malware on the host is blocking access to the suspicious file, or where the suspicious file is a system file to which read access is prevented by the operating system. To resolve this type of issues, the host computer may, at act 515, be booted into an offline environment, such as Preboot eXecution Environment (PXE). In such an environment, the main operating system and any potential malware may become inactive, thereby releasing the suspicious file for read access. Then, at act 520, another attempt may be made to access the suspicious file and the corresponding hash values may be computed at act 520.

While in the illustrative process 500 the host computer is booted in an offline environment in the event of an access failure, the present disclosure is not so limited. In various embodiments, the host computer may be booted in an offline environment at any suitable point during the false positive analysis, for example, before making any access attempts. This may be effective against more sophisticated malware attacks that are adapted to return a "clean" view of an affected file whenever attempt is made to access the affected file. That is, booting the host computer in an offline environment may deactivate any such hiding mechanism and may allow access to a true view of the affected file.

Additionally, the host computer may remain in the offline environment for any suitable period of time, for example, throughout the false positive analysis. It may even remain in the offline environment after it has been determined that a false positive is unlikely. For instance, damage repairs in the case of a true malware outbreak may be carried out while the host computer is in an offline state, as well as any further scanning after the repairs are done.

Figure 6:
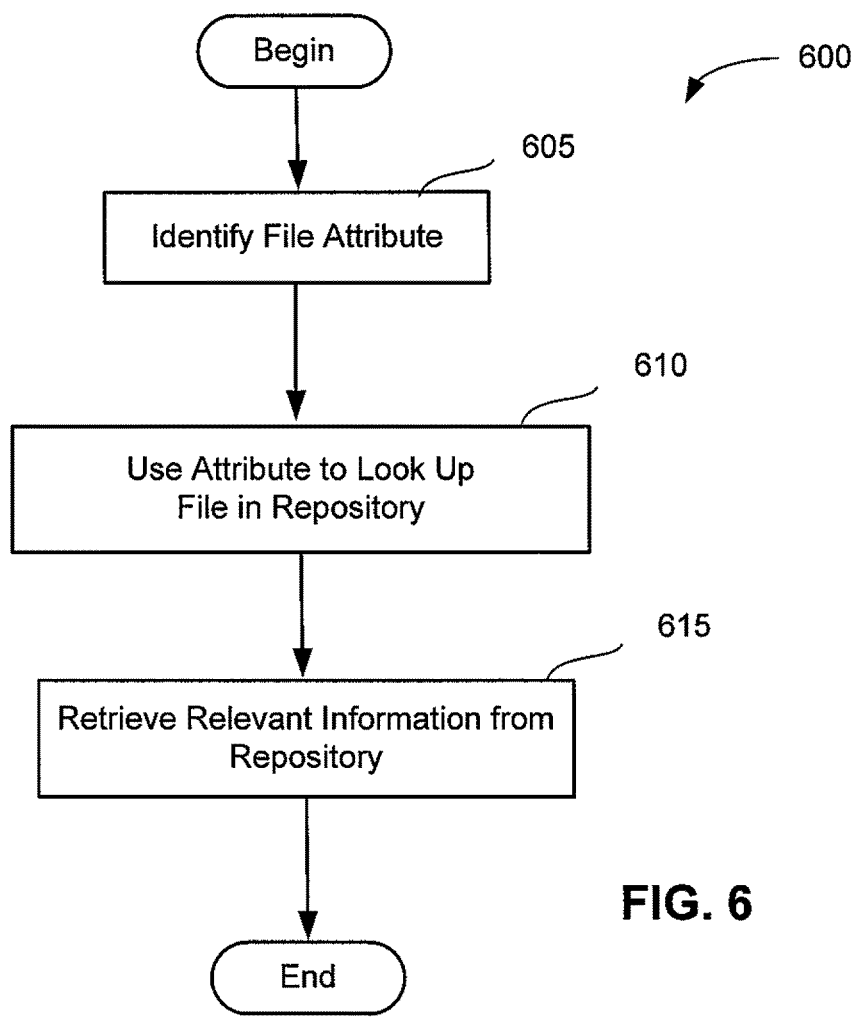
FIG. 6 shows an illustrative process for retrieving information from a file information repository, in accordance with some embodiments of the present disclosure.

FIG. 6 shows an illustrative process 600 for retrieving information from a file information repository (e.g., the file information repository 230 shown in FIGS. 2A-B). This process may be performed as part of a false positive analysis triggered by the receipt of a malware report identifying a particular file as potentially malicious, and the information retrieved from the file information repository may relate to a control version of a file that is believed to be free of malware. For instance, the process 600 may be performed during act 325 of the process 300 shown in FIG. 3, and may be performed by, or under the control of, the server 220 shown in FIG. 2, or by another suitable computing device.

At act 605, an attribute of the suspicious file may be identified based on information available in the received malware report. In some embodiments, the identified attribute may be a file name, a file system path or some other suitable identifier. In other embodiments, the identified attribute may further include a version identifier for the suspicious file, which may be extracted directly from the malware report, or obtained indirectly by accessing a host directory (e.g., the host directory 240 shown in FIG. 2C) using a host name and a file name. In yet some other embodiments, the identified attribute may further include an identifier for one or more OS components and/or software applications associated with the suspicious file.

At act 610, the file attribute identified at act 605 may be used as an index to look up the suspicious file in the file information repository. If the look up is successful (e.g., if the desired version of the suspicious file is maintained by the file information repository), relevant information may be retrieved at act 615, such as actual file content and/or one or more corresponding hash values.

While the examples above involve specific types of information relating to a file, it should be appreciated that the present disclosure is not so limited. Other suitable types of information may also be maintained by, and accesses from, a file information repository, including file size, authorship, white list information, and the like. Also, depending on how the file information repository is organized, different types of information may be used to index a desired version of a file.

FIG. 7 shows an illustrative process 700 for mitigating potential negative effects of false positives in malware detection. This process may be carried out when one or more malware reports have been classified as likely false positives, for instance, as a result of the analysis performed during the process 300 shown in FIG. 3.

At act 705, one or more malware signatures associated with a likely false positive may be identified, for example, based on the malware report received from an anti-malware program. At act 710, it is determined whether the identified signatures have been recently published by an anti-malware provider. For example, it may be determined whether at least one identified signature was first updated by an anti-malware provider within an interval of time of a defined length prior to the false positive analysis. Any suitable length may be selected for the interval, such as 24, 48 or 72 hours. This information may be available in the malware report, or it may be obtained from an anti-malware vendor that published the identified signature.

If it is determined at act 710 that the one or more signatures involved in a likely false positive have been published recently, the process 700 may proceed to act 715 to take a suitable corrective action, such as reverting to a previous signature set not including the problematic signatures. Alternatively, or additionally, the problematic signatures may be added to an "ignore" list to be excluded in future scans.

Any of the above corrective actions may be carried out locally on an affected host, or more globally on one or more other hosts. For example, corrective actions may be taken on all hosts within the same local network. Alternatively, where the false positive involves a system file, corrective actions may be taken on all hosts running the same version of OS as the affected host. As yet another example, where the false positive involves a software application file, corrective actions may be taken on all hosts running the same version of the application. These interim solutions may prevent further false positives from overwhelming the enterprise network.

Having taken any desired corrective actions, the process 700 may proceed to act 720 report the false positive incidences to an anti-malware vendor that published the problematic signatures. The report may include any information that may assist the anti-malware vendor in identifying one or more causes of the false positives. For example, the report may identify a file that has been incorrectly classified as malicious and/or any associated OS component or software application.

In response to receiving such a false positive report, the anti-malware vendor may conduct further research and publish a solution, such as an improved set of signatures. This new signature set may be received at act 725 and used at act 730 to update the anti-malware program running on one or more host computers within an enterprise environment.

Figure 8:
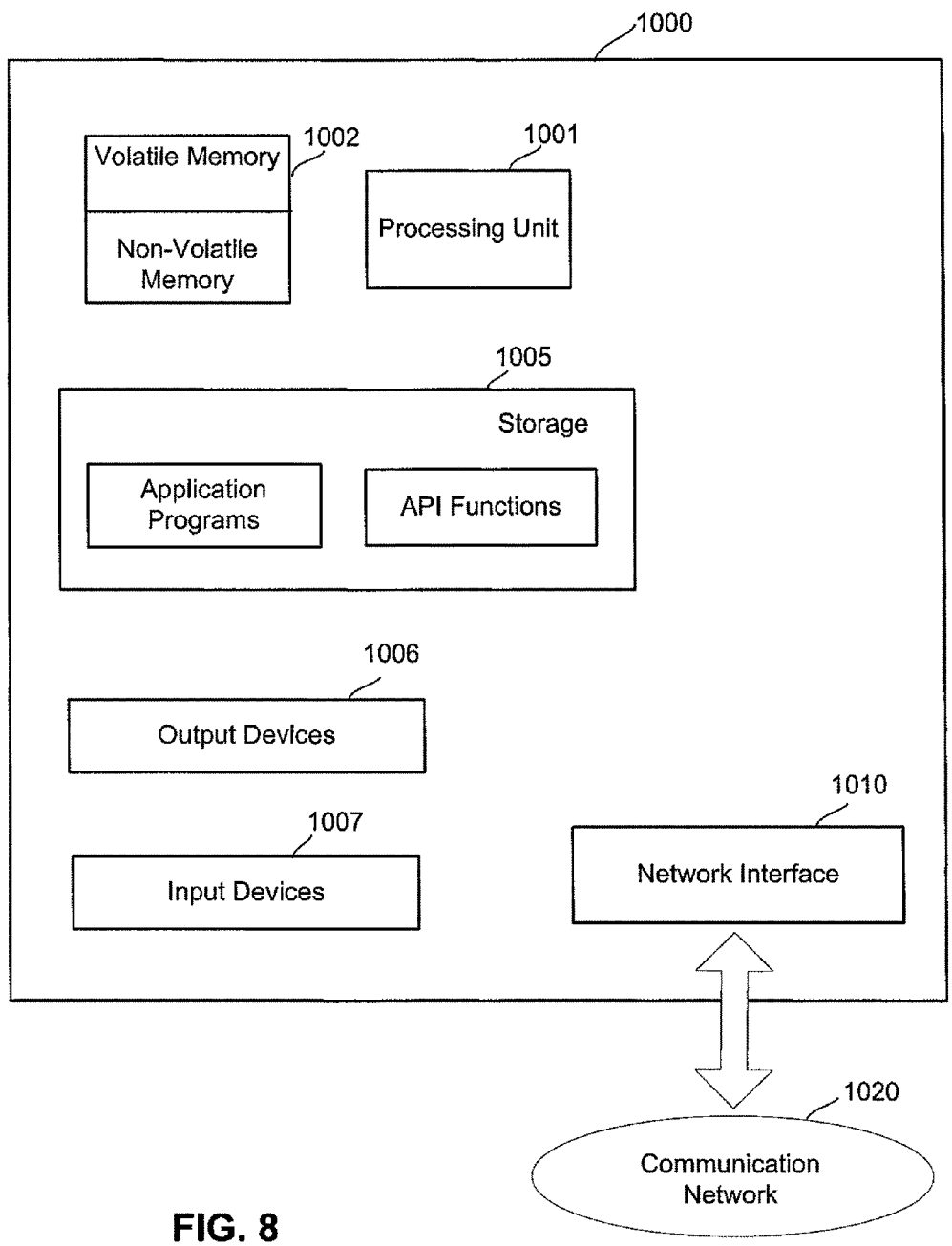
FIG. 8 shows an illustrative computer on which various inventive aspects of the present disclosure may be implemented.

Various inventive aspects described herein can be used with any one or more computers and/or devices each having one or more processors that may be programmed to take any of the actions described above for detecting malware in data sequences. FIG. 8 shows, schematically, an illustrative computer 1000 on which various inventive aspects of the present disclosure may be implemented. The computer 1000 includes a processor or processing unit 1001 and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also one more application programs and/or Application Programming Interface (API) functions.

For instance, a host computer may include programs to generate malware reports and respond to remediation commands from a server computer. A server computer may include programs to collect malware reports from multiple host computers and issue commands based on an outcome of a false positive analysis (e.g., whether the collected malware reports correspond to a likely false positive or a potential malware outbreak).

As mentioned above, the reference herein to a computer can include any device having a programmed processor, including a rack-mounted computer, a desktop computer, a laptop computer, a tablet computer or any of numerous devices that may not generally be regarded as a computer, which include a programmed processor (e.g., a PDA, an MP3 Player, a mobile telephone, wireless headphones, etc.).

The computer 1000 may have one or more input devices and/or output devices, such as devices 1006 and 1007 illustrated in FIG. 8. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 8, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be within the spirit and scope of the invention. Accordingly, the foregoing description and drawings are by way of example only.

The above-described embodiments of the invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable storage media) (e.g., a computer memory, one or more floppy discs, compact discs (CDs), optical discs, digital video disks (DVDs), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A system for recognizing false positives in malware detection, comprising a server computer having at least one processor programmed to:
    receiving, at the server computer, at least one malware report identifying at least one suspicious version of a file on a host computer;
    upon receipt of identification of a suspicious version of a file, determining whether the suspicious version of the file is a false positive by:
        performing a first analysis to determine whether a likelihood of a false positive is low;
        upon determining the likelihood of a false positive is low, reporting a malware attack; and
        upon determining the likelihood of a false positive is not low, performing a second analysis to recognize a false positive by:
            obtaining first summary information associated with the suspicious version of the file,
            obtaining second summary information associated with a control version of the file,
            comparing the first and second summary information to determine whether the suspicious version of the file matches the control version of the file, and
            when it is determined that the suspicious version matches the control version, reporting a false positive.

2. The system of claim 1, wherein the first summary information is a hash of at least a portion of the suspicious version of the file, and the second summary information is a hash of a corresponding portion of the control version of the file.

3. The system of claim 1, wherein the second summary information associated with the control version of the file is obtained at least in part by:
    identifying an attribute of the file; and
    accessing a file information repository using the identified attribute.

4. The system of claim 1, wherein the at least one malware report is a first malware report, and wherein:
    the at least one processor is further programmed to determine whether at least one second malware report has been received identifying a same malware signature as the first malware report; and
    the acts of obtaining the first and second summary information are performed when it is determined that an amount of one or more received second malware reports identifying the same malware signature exceeds a selected threshold.

5. The system of claim 4, wherein, when it is determined that at least one second malware report identifying the same malware signature has not been received, the at least one processor is further programmed to initiate a malware scan on a plurality of other host computers.

6. The system of claim 1, wherein the at least one malware report further identifies a malware signature, and wherein the at least one processor is further programmed to:
    determine whether the malware signature was recently updated; and
    when it is determined that the malware signature was recently updated, report a possible false positive and perform further processing including obtaining the first and second summary information.

7. The system of claim 6, wherein the at least one processor is further programmed to:
    determine whether the file was recently added or modified on the host computer;
    when it is determined that the file was recently added or modified, report a possible false positive and perform further processing including obtaining the first and second summary information.

8. The system of claim 1, wherein the first summary information is obtained at least in part by hashing at least a portion of the suspicious version of the file, and wherein the at least one processor is further programmed to:
    attempt to access the suspicious version of the file; and
    if the attempt is unsuccessful, boot the host computer in a protected environment and reattempt access.

9. A method for recognizing false positives in malware detection, comprising:
    receiving, at a computing device, at least one malware report identifying at least one suspicious version of a file on a host computer;
    upon receipt of identification of a false positive, determining, at a computing device, whether the suspicious version of the file is a false positive by:
        performing a first analysis to determine whether a likelihood of a false positive is low;
        upon determining the likelihood of a false positive is low, reporting a malware attack; and
        upon determining the likelihood of a false positive is not low, performing a second analysis to recognize a false positive by:
            obtaining first summary information associated with the suspicious version of the file,
            obtaining second summary information associated with a control version of the file,
            comparing the first and second summary information to determine whether the suspicious version of the file matches the control version of the file, and
            when it is determined that the suspicious version matches the control version, reporting, at a computing device, a false positive.

10. The method of claim 9, wherein the first summary information is a hash of at least a portion of the suspicious version of the file, and the second summary information is a hash of a corresponding portion of the control version of the file.

11. The method of claim 9, wherein the second summary information associated with the control version of the file is obtained at least in part by:
    identifying an attribute of the file; and
    accessing a file information repository using the identified attribute.

12. The method of claim 9, wherein the at least one malware report is a first malware report, and wherein the method further comprises:

determining whether at least one second malware report has been received identifying a same malware signature as the first malware report, wherein the acts of obtaining the first and second summary information are performed when it is determined that at least one second malware report identifying the same malware signature has been received.

13. The method of claim 12, further comprising:

when it is determined that at least one second malware report identifying the same malware signature has not been received, initiating a malware scan on a plurality of other host computers.

14. The method of claim 9, wherein the at least one malware report further identifies a malware signature, and wherein the method further comprises:

determining whether the malware signature was recently updated; and when it is determined that the malware signature was recently updated, reporting a possible false positive and performing further processing including obtaining the first and second summary information.

15. The method of claim 14, further comprising:

determining whether the file was recently added or modified on the host computer;

when it is determined that the file was recently added or modified, reporting a possible false positive and performing further processing including obtaining the first and second summary information.

16. The method of claim 9, wherein the first summary information is obtained at least in part by hashing at least a portion of the suspicious version of the file, and wherein the method further comprises:

attempting to access the suspicious version of the file; and if the attempt is unsuccessful, booting the host computer in a protected environment and reattempting access.

17. At least one computer-readable storage device encoded with instructions that, when executed on a processor, perform a method for recognizing false positives in malware detection, the method comprising:

receiving at least one malware report identifying at least one suspicious version of a file on a host computer;

upon receipt of identifying a suspicious version of a file, determining whether the suspicious version of the file is a false positive by:

performing a first analysis to determine whether a likelihood of a false positive is low;

upon determining the likelihood of a false positive is low, reporting a malware attack; and upon determining the likelihood of a false positive is not low, performing a second analysis to recognize a false positive by:

obtaining first summary information associated with the suspicious version of the file, obtaining second summary information associated with a control version of the file, comparing the first and second summary information to determine whether the suspicious version of the file matches the control version of the file, and when it is determined that the suspicious version matches the control version, reporting a false positive.

18. The at least one computer-readable storage device of claim 17, wherein the first summary information is a hash of at least a portion of the suspicious version of the file, and the second summary information is a hash of a corresponding portion of the control version of the file.

19. The at least one computer-readable storage device of claim 17, wherein the at least one malware report is a first malware report, and wherein the method further comprises:

determining whether at least one second malware report has been received identifying a same malware signature as the first malware report, wherein the acts of obtaining the first and second summary information are performed when it is determined that at least one second malware report identifying the same malware signature has been received.

20. The at least one computer-readable storage device of claim 17, wherein the at least one malware report further identifies a malware signature, and wherein the method further comprises:

determining whether the malware signature was recently updated; and when it is determined that the malware signature was recently updated, reporting a possible false positive and performing further processing including obtaining the first and second summary information.

\* \* \* \* \*